United States Patent Office 3,799,923
Patented Mar. 26, 1974

3,799,923
3-THIOLATED CEPHALOSPORIN DERIVATIVES AND PRODUCTION OF SAME
Tadayoshi Takano, Hirakata, Masaru Kurita, Takatsuki, Hiroo Nikaido, Suita, Masashi Mera, Amagasaki, Nobukiyo Konishi, Kyoto, and Ritsuko Okui, Takatsuki Japan, assignors to Fujisawa Pharmaceutical Co., Ltd., Osaka, Japan
No Drawing. Filed Jan. 3, 1972, Ser. No. 215,183
Int. Cl. C07d 99/24
U.S. Cl. 260—243 C                6 Claims

ABSTRACT OF THE DISCLOSURE

The present invention discloses cephalosporin derivatives, having in their 3-position a 5-mercapto-1, 3,4-thiadiazol-2-ylthio group and in their 7-position a tetrazolyl radical, which are active against microorganisms, including *Proteus mirabilis*.

---

This present invention is concerned with 3-thiolated cephalosporin derivatives and a process for preparing same. More particularly, it relates to 3-(5-mercapto-1,3,4-thiadiazol-2-ylthiomethyl) - 7 - (tetrazolylalkanamido)-3-cephem-4-carboxylic acids, their pharmaceutically acceptable non-toxic composition and a process for preparing them. These cephalosporin derivatives show a wide spectrum against microorganisms including *Proteus mirabilis*.

Various 3,7-di(heterocyclically substituted) - cephalosporin compounds are disclosed in several patents. However, there is still a demand for cephalosporins that exhibit a wide antibacterial spectrum against microorganism which particularly heretofore known cephalosporins are not sufficient enough to inhibit growing. The present inventors have disclosed in German "Offenlegungsschrift 1,953,861" that the compound having a 5-methylthio-1,3,4-thiadiazol-2-ylthiomethyl group in the 3-position of the cephalosporin ring was active against some microorganisms, but we needed another cephalosporin compound to satisfy the hereinbefore mentioned demand and completed the present invention.

In accordance with the present invention, the 3-thiolated cephalosporin derivatives may be represented by the following general structural formula:

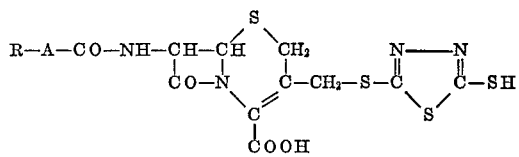

in which R is a tetrazolyl radical and A is a lower alkylene radical having up to four carbon atoms.

The term "tetrazolyl" herein defined means a monovalent 5-membered heterocyclic ring consisting of four nitrogen atoms and one carbon atom, such as 1H-tetrazolyl and 2H-tetrazolyl, which may be substituted by possible substituents such as a lower alkyl radical having up to four carbon atoms, i.e., methyl, ethyl, propyl, isopropyl, butyl, isobutyl, tert.-butyl, 1-methylpropyl, or 2-methylpropyl.

The term "lower alkylene" herein referred to means a divalent aliphatic hydrocarbon, straight or branch-chained, having up to four carbon atoms such as methylene, ethylene, propylene, butylene, 1-methylypropylene, 2-methylpropylene, 2-ethylethylene, and 1-propylmethylene.

The nontoxic pharmaceutically acceptable salts of the compound of Formula I are similarly useful.

Preferred compounds are those wherein R is a 1H-tetrazol-1-yl group and A is a methylene group.

In accordance with the present invention, the new compounds may be produced by several alternate routes from 7-aminocephalosporanic acid or cephalosporin C as shown in U.S. Pat. No. 3,516,997 and in German "Offenlegungsschrift 2,055,796." On of the routes according to the present invention is the one in which the desired compounds are produced from a 7-acylated aminocephalosporanic acid of formula:

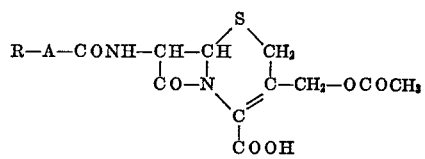

in which R and A are as defined above, or its salt by nucleophilic displacement with a dithiol of formula:

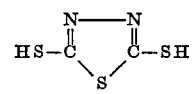

The reaction is conducted in the presence of an inert solvent, e.g., acetone, dioxane, methanol, ethanol, tetrahydrofuran, and the like or of a mixture of such solvents or of an aqueous solution of such solvents or of water or buffer solutions, e.g., phosphate buffers and the like, or of any other suitable diluent. When such diluents are used, buffers are preferably employed in the treatment of the dithiols in their free form, whereby the dithiols are transformed into a reactive form. Whenever the starting compounds are used in their free form, the reaction is carried out in the presence of a base, for example, sodium bicarbonate, triethylamine, and the like. The presence of such a base is also preferred in the reaction between both the starting compounds either in their free form or in their salt and the dithiols. The reaction may also be accomplished at an elevated temperature under weakly acidic conditions, and, if necessary, under pressure and/or in the atmosphere of an inert gas, e.g., nitrogen. But the reaction conditions are not critical with respect to temperature, pressure, pH value, and the like.

The desired compounds of the present invention are preferably converted for pharmaceutical purpose into the corresponding nontoxic, pharmaceutically acceptable salts which can be prepared by a treatment, for example, with an alkali metal, e.g., sodium, potassium, and the like, an amine, e.g., diphenylenediamine, dicyclohexylamine, dibenzylethylenediamine, triethylamine, and the like.

The desired compounds according to the present invention may be used as medicaments in the form of pharmaceutical preparations, which contain the 3-thiolated cephalosporin derivatives or the salts thereof in admixture with a pharmaceutically acceptable organic or inorganic, solid or liquid carrier suitable for oral or parenteral administration. The pharmaceutical preparations may be in solid form, such as capsules, tablets, or dragées, or in liquid from such as solutions, suspensions, or emulsions. If desired, there can be included in the above preparations auxiliary substances, for example, preserving agents, stabilizing agents, wetting or emulsifying agents, salts for varying the osmotic pressure and buffers.

The following examples are illustrative of the invention, but it is to be understood that they are not to be considered as limitative.

EXAMPLE 1

7-(1H-tetrazol-1-ylacetamido)-3-(5-mercapto-1,3,4-thiadiazol-2-yl)thiomethyl-3-cephem-4-carboxylic acid A solution of 4.1 g. sodium 7-(1H-tetrazol-1-ylacetamido)cephalosporanate (½H₂O), 1.48 g. 1,3,4-thiadiazole-2,5-dithiol and 1.68 g. sodium bicarbonate in 80 ml. phosphate buffer (pH 6.4) was stirred for 3 hours at 65° C. The reaction mixture was filtered, and the filtrate was adjusted with 10% hydrochloric acid to pH 5–6 and washed with ethyl acetate. The aqueous layer separated was adjusted again with 10% hydrochloric acid to pH 2–3 and extracted with ethyl acetate. The extract was washed with a saturated sodium chloride solution, dried over magnesium sulfate and decolored by active carbon. After the solvent was distilled off under reduced pressure, the residue was triturated with ether to yield 2.78 g. 7-(1H-tetrazol-1-ylacetamido)-3-(5-mercapto-1,3,4-thiadiazol-2-yl)thiomethyl-3-cephem-4-carboxylic acid, M.P. 88–90° C. (decomposed).

EXAMPLE 2

7-(2H-tetrazol-2-ylacetamido)-3-(5-mercapto-1,3,4-thiadiazol-2-yl)thiomethyl-3-cephem-4-carboxylic acid A solution of 4.82 g. triethylamine salt of 7-(2H-tetrazol-2-ylacetamido)cephalosporanic acid, 1.50 g. 1,3,4-thiadiazole-2,5-dithiol and 1.68 g. sodium bicarbonate in 60 ml. phopshate buffer (pH 6.4) was treated by substantially the same procedures as in Example 1 to yield 1.01 g. powdery 7-(2H-tetrazol-2-ylacetamido)-3-(5-mercapto-1,3,4-thiadiazol-2-yl)thiomethyl - 3 - cephem-4-carboxylic acid, M.P. 115–120° C. (decomposed).

We claim:
1. A compound of the formula

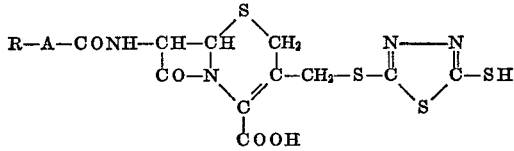

in which R is a tetrazolyl radical selected from the group consisting of 1-(1H-tetrazolyl) and 2-(2H-tetrazolyl), and A is a lower alkylene radical.

2. A compound according to claim 1 wherein R is 1-(1H-tetrazolyl) and A is methylene.

3. A compound according to claim 1 wherein R is 2-(2H-tetrazolyl) and A is methylene.

4. A process for preparing a compound according to claim 1 which comprises reacting a compound of formula:

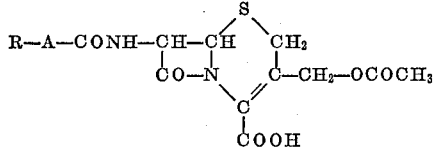

in which R and A are as defined above, or a non-toxic, pharmaceutically acceptable salt thereof with a dithiol of formula:

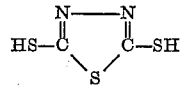

and, when desired, converting the product into a non-toxic, pharmaceutically acceptable salt.

5. A process according to claim 4 wherein R is 1-(1H-tetrazolyl) or 2-(2H-tetrazolyl) and A is methylene.

6. A process according to claim 4 wherein the reaction is carried out in an aqueous solvent containing a phosphate buffer.

References Cited
UNITED STATES PATENTS 3,516,997    6/1970    Takano et al. _____ 260—243 C NICHOLAS S. RIZZO, Primary Examiner U.S. Cl. X.R.

424—246